United States Patent
Yamazaki et al.

(10) Patent No.: US 9,821,250 B2
(45) Date of Patent: Nov. 21, 2017

(54) PREPARATIVE SEPARATION-PURIFICATION SYSTEM FOR CAPTURING TARGET COMPONENTS

(71) Applicant: Shimadzu Corporation, Kyoto (JP)

(72) Inventors: Tomoyuki Yamazaki, Kyoto (JP); Przemyslaw Stasica, Hertfordshire (GB); Bob Boughtflower, Hertfordshire (GB)

(73) Assignee: Shimadzu Corporation, Kyoto (JP)

( * ) Notice: Subject to any disclaimer, the term of this patent is extended or adjusted under 35 U.S.C. 154(b) by 475 days.

(21) Appl. No.: 13/893,108

(22) Filed: May 13, 2013

(65) Prior Publication Data
US 2013/0306536 A1    Nov. 21, 2013

(30) Foreign Application Priority Data
May 15, 2012 (JP) ................................ 2012-111177

(51) Int. Cl.
  *B01D 21/24* (2006.01)
  *B01D 24/38* (2006.01)
  (Continued)

(52) U.S. Cl.
  CPC ......... *B01D 15/424* (2013.01); *B01D 15/245* (2013.01)

(58) Field of Classification Search
  CPC .... B01D 11/0403; B01D 15/00; B01D 15/08; B01D 15/10; B01D 15/14; B01D 15/24;
  (Continued)

(56) References Cited

U.S. PATENT DOCUMENTS

| 2007/0295664 A1* | 12/2007 | Glatz | G01N 30/462 |
| | | | 210/656 |
| 2010/0276350 A1* | 11/2010 | Kono | B01D 15/20 |
| | | | 210/198.2 |
| 2013/0306535 A1* | 11/2013 | Yamazaki | B01D 15/22 |
| | | | 210/198.2 |

FOREIGN PATENT DOCUMENTS

| GB | 2465954 A | 6/2010 |
| GB | 2465955 A | 6/2010 |
| (Continued) | | |

OTHER PUBLICATIONS

Examination Report received for Chinese Patent Application No. 201310177990.1 dated Jul. 3, 2014, 6 pages (1 page of English Translation and 5 pages of Office Action).

(Continued)

*Primary Examiner* — Dirk Bass
*Assistant Examiner* — Hayden Brewster
(74) *Attorney, Agent, or Firm* — Morgan, Lewis & Bockius LLP

(57) ABSTRACT

In a preparative separation-purification system for passing a solution containing a target component through a trap column to capture the target component in the column, and for subsequently passing an eluting solvent through the column to elute the captured component and collect it in a container, a dilution passage is merged with a collection passage for sending an eluate from the outlet end of the trap column to the collection container, and a diluting liquid is intermittently introduced through the dilution passage into the collection passage. The diluting liquid lowers the concentration of the target component in the eluate and impedes the deposition of the target component. Thus, clogging of the passage due to the deposition of the target component eluted from the trap column is effectively prevented.

4 Claims, 4 Drawing Sheets

(51) Int. Cl.
*B01D 25/30* (2006.01)
*B01D 29/88* (2006.01)
*B01D 33/70* (2006.01)
*B01D 33/82* (2006.01)
*B01D 15/42* (2006.01)
*B01D 15/24* (2006.01)
*G01N 1/00* (2006.01)
*G01N 11/00* (2006.01)
*G01N 30/00* (2006.01)

(58) Field of Classification Search
CPC .... B01D 15/42; B01D 15/245; B01D 15/163; B01D 15/166; B01D 15/247; B01D 15/424; B01D 15/1828; B01D 15/1842; B01D 21/24; B01D 24/38; B01D 25/30; B01D 29/88; B01D 33/82; B01D 2215/023; B01J 20/32; B01J 2220/54; C02F 1/28; C02F 1/686; C02F 2209/40; G01N 1/00

USPC .......... 210/96.2, 101, 143, 198.2, 656, 659; 73/53.01, 61.52, 61.53, 61.56, 61.57; 134/171

See application file for complete search history.

(56) References Cited

FOREIGN PATENT DOCUMENTS

| | | |
|---|---|---|
| GB | 2465956 A | 6/2010 |
| JP | 02-122260 | 5/1990 |
| JP | 2003-149217 | 5/2003 |

OTHER PUBLICATIONS

Combined Search and Examination Report under Sections 17 and 18(3) for European Patent Application No. GB1308613.7 dated Oct. 28, 2013.

\* cited by examiner

PREPARATIVE SEPARATION-PURIFICATION SYSTEM FOR CAPTURING TARGET COMPONENTS

TECHNICAL FIELD

The present invention relates to a preparative separation-purification system for separately extracting one or more components from a solution by a liquid chromatograph, and purifying and collecting each of the components. More specifically, it relates to a preparative separation-purification system using a trap column for temporarily capturing a target component.

BACKGROUND ART

Preparative separation-purification systems using liquid chromatographs are used in pharmaceuticals or similar fields in order to collect samples for creating a library of various kinds of chemically synthesized compounds or analyzing the details of such compounds. Conventional examples of preparative separation-purification systems are disclosed in Patent Documents 1 and 2 as well as other documents.

In these apparatuses, target components (compounds) in a sample solution are temporally separated by a liquid chromatograph. The separated target components are introduced into respective trap columns and temporarily captured therein. Subsequently, a solvent is supplied to each trap column to quickly elute the component from the trap column and collect it in a container. Thus, a plurality of solutions, each of which contains one target component at a high concentration, is collected in respective containers. These separately collected solutions are then subjected to a vaporizing and drying process to remove the solvent and collect the target components in solid forms.

BACKGROUND ART DOCUMENT

Patent Document

Patent Document 1: JP-A H2-122260
Patent Document 2: JP-A 2003-149217

SUMMARY OF THE INVENTION

Problem to be Solved by the Invention

However, if a target compound is eluted from the trap column at a high concentration, the target compound easily leaves deposits within the tube on the downstream side of the trap column, thereby clogging the passage and impeding the flow of the solution.

The present invention has been developed in view of the aforementioned problem. Its objective is to provide a preparative separation-purification system capable of effectively preventing clogging of a passage due to the deposition of a target component eluted from a trap column.

Means for Solving the Problems

The present invention aimed at solving the aforementioned problem is a preparative separation-purification system for passing a solution containing a target component through a trap column to capture the target component in the trap column, and for subsequently passing an eluting solvent through the trap column to elute the target component captured in the trap column and collect the eluted component in a collection container, including:

a) a supply passage for supplying the eluting solvent to one end of the trap column;

b) a collection passage for sending the eluate exiting the other end of the trap column to the collection container;

c) a diluting liquid supply passage, connected to a portion of the collection passage, for supplying into the collection passage a diluting liquid for lowering the concentration of the target component in the eluate; and d) a liquid-sending system for alternately performing the supply of the eluting solvent into the supply passage and the supply of the diluting liquid into the diluting liquid supply passage.

In the preparative separation-purification system according to the present invention, an eluting solvent is supplied through the supply passage into a trap column to elute a target component captured in the trap column. While an eluate (i.e. an eluting solvent containing the target component) exiting from the trap column is flowing through the collection passage, a diluting liquid is intermittently introduced from the diluting liquid supply passage into the collection passage. As a result, the eluate, which contains the target component at a high concentration, is diluted, whereby the deposition of the target component in the collection passage is suppressed. Furthermore, while the diluting liquid is intermittently introduced in the previously described manner, the eluate exiting the trap column and the diluting liquid introduced from the dilution passage alternately flow in the collection passage. Therefore, even if the target component in the eluate leaves deposits in the eluate and sticks to the tube, the deposited compound will be dissolved in the subsequently supplied diluting liquid, whereby clogging of the passage is effectively prevented.

In the preparative separation-purification system according to the present invention, the eluting solvent may be any solvent as long as it has a strong eluting power on the target component. For example, organic solvents, such as dichloromethane (DCM) or methanol, can be used. The diluting liquid in the present invention may also be any solvent which can adequately dissolve the target component (i.e. in which the target component is highly soluble). For example, the same kinds of liquid as the eluting solvent may also be used as the diluting liquid. In this case where the same kind of liquid may be used as both the eluting solvent and the diluting liquid, it is possible to store that liquid in one container and configure the liquid-sending system so as to draw the liquid from this container and alternately send it to the supply passage of the eluting solvent and the dilution passage as needed.

In one mode of the preparative separation-purification system according to the present invention, the liquid-sending system includes:

e) a liquid-sending pump provided in the supply passage;

f) a passage selector, provided in the supply passage between the liquid-sending pump and the trap column, for switching the passage so that the liquid supplied through the liquid-sending pump is selectively sent to either the trap column or the diluting liquid supply passage; and g) a controller for operating the passage selector so as to alternately perform the supply of liquid to the trap column and the supply of liquid to the diluting liquid supply passage.

In this system, a single liquid-sending pump is used to draw and send both the eluting solvent and the diluting liquid, and the passage selector is operated so that the liquid drawn by the pump is selectively sent to either the trap column or the diluting liquid supply passage. This system may be configured so that a liquid different from the eluting solvent can be used as the diluting liquid. This can be achieved by providing an additional passage selector on the upstream side of the liquid-sending pump in such a manner that either the eluting solvent or the diluting liquid will be selectively drawn by the liquid-sending pump by changing the setting of the additional passage selector.

In another mode of the preparative separation-purification system according to the present invention, the liquid-sending system includes:

h) a first liquid-sending pump provided in the supply passage;

i) a second liquid-sending pump provided in the diluting liquid supply passage; and j) a controller for operating the first liquid-sending pump and the second liquid-sending pump so as to alternately perform the supply of the eluting solvent by the first liquid-sending pump and the supply of the diluting liquid by the second liquid-sending pump.

Although the preparative separation-purification system according to the present invention may be configured so that a solution which has been prepared beforehand by an appropriate device (e.g. a fraction collector of a preparative liquid chromatograph) to contain a target component is supplied to the supply passage for collecting the target component in the trap column, it may also be directly coupled with a liquid chromatograph to construct an "on-line" trapping system. That is to say, the present system may be configured so that a liquid sample is carried by a predetermined mobile phase into a separation column of a liquid chromatograph and an eluate from the separation column is supplied to the supply passage to capture the target component contained in the eluate in the same trap column.

Effect of the Invention

As described thus far, in the preparative separation-purification system according to the present invention, clogging of the passage due to the deposition of a target component eluted from the trap column is effectively prevented.

BEST MODE FOR CARRYING OUT THE INVENTION

Figure 1:
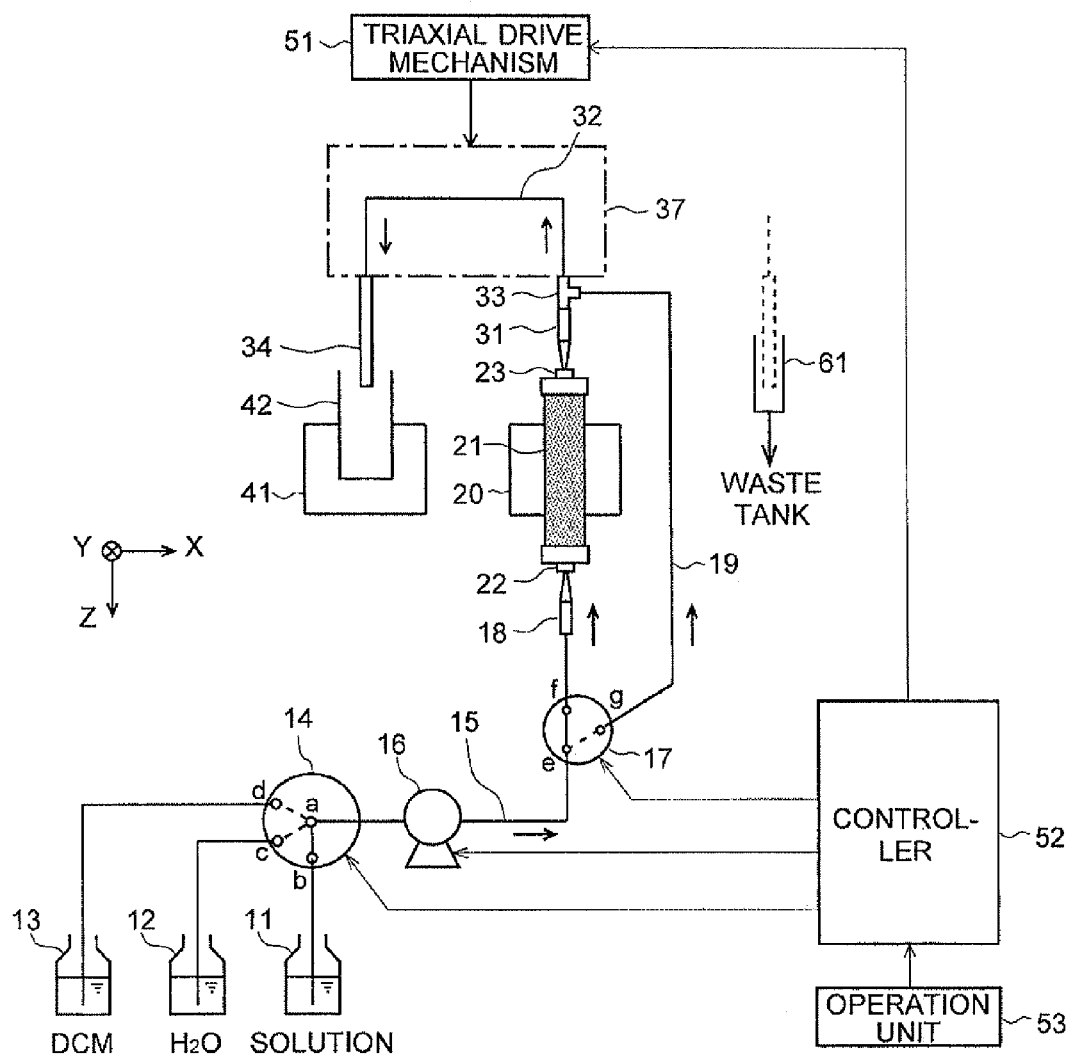
FIG. 1 is a schematic configuration diagram of a preparative separation-purification system according to one embodiment of the present invention.

Modes for carrying out the present invention will be hereinafter described by means of embodiments. FIG. 1 is a schematic configuration diagram of a preparative separation-purification system according to one embodiment of the present invention. The present system is designed for purifying a target component contained in a solution prepared by a preparative liquid chromatograph (not shown) and collecting the purified component in solid forms. It is also possible to modify the configuration to an "on-line" system in which a preparative liquid chromatograph is directly connected to the system to directly introduce a solution containing various components separated by the liquid chromatograph.

In FIG. 1, a solution container 11 holds a fraction of solution prepared beforehand in the aforementioned manner. This solution contains a target component dissolved in a solvent which is mainly composed of a mobile phase used in the preparative liquid chromatograph. A wash-liquid container 12 holds pure water ($H_2O$) to be used for washing a column. A solvent container 13 holds dichloromethane (represented as "DCM" in FIG. 1) to be used as both the eluting solvent and the diluting liquid. A first selector valve 14, which is a three-way selector valve, is used for changing the passage configuration to selectively draw a liquid from one of the three containers 11, 12 and 13 and send it to a supply passage 15. The first selector valve 14 has three inlet ports b, c and d, with three tubes respectively connected thereto so as to draw one of the three liquids held in the solution container 11, the wash-liquid container 12 and the solvent container 13. The first selector valve 14 also has an outlet port a, to which one end of the aforementioned supply passage 15 is connected. The other end of the supply passage 15 is connected to the base end (the end opposite from the tip) of a first needle 18, which consists of a cylindrical needle with a pointed tip. A liquid-sending pump 16 for drawing and sending liquid at a predetermined flow rate is provided in the supply passage 15. A second selector valve 17, which is a two-way selector valve, is provided between the pump 16 and the first needle 18. (The configuration and operation of this valve will be described later.)

A column rack 20 holds a plurality of trap columns 21 arranged in the direction perpendicular to the drawings sheet (i.e. the Y-direction in FIG. 1). Each trap column 21 is packed with grains of filler for capturing a target component. On the column rack 20, each trap column 21 is almost vertically held, with the inlet end directed downward, to which the supply passage 15 is to be connected, and the outlet end directed upward, to which a collection passage 32 is to be connected.

One end of the collection passage 32, which a liquid exiting from the trap column 21 passes through, is connected to the base end of a second needle 31 consisting of a cylindrical needle with a pointed tip. The other end of the collection passage 32 is connected to the base end of a cylindrical ejection nozzle 34.

A plurality of collection containers 42 for collecting separated and purified target components is held in a container rack 41 and arranged at intervals corresponding to the trap columns 21 in the direction perpendicular to the drawings sheet. An amount of liquid ejected from the tip of the ejection nozzle 34 is dropped into one of these collection containers 42.

The collection passage 32, the second needle 31 and the ejection nozzle 34 are attached to a fraction collector head 37, which can be moved vertically (i.e. in the Z-direction in FIG. 1) as well as horizontally (i.e. in the X and Y directions in FIG. 1) by means of a triaxial drive mechanism 51. By horizontally moving the fraction collector head 37, the second needle 31 can be moved to a position directly above any one of the trap columns 21 held in the column rack 20.

This operation simultaneously brings the ejection nozzle 34 to a position directly above one collection container 42 held at the position in the container rack 41 corresponding to the aforementioned one of the trap columns 21. From this position, the fraction collector head 37 can be lowered to a level where the tip of the second needle 31 is inserted into the needle port 23 at the outlet end of the selected trap column 21 to connect the collection passage 32 to that outlet end. This operation also lowers the tip of the ejection nozzle 34 into the selected collection container 42 to a position where liquid can be dropped from the tip of the ejection nozzle 34 into that collection container 42. A disposal port 61 having a receiver and a disposal passage leading to a waste tank (not shown) is also placed within a range over which the fraction collector head 37 can be moved by the triaxial drive mechanism 51.

The first needle 18 can also be moved vertically and horizontally by another drive mechanism (not shown). By using this mechanism, the first needle 18 can be moved horizontally to a position directly below one of the trap columns 21 held in the column rack 20 and then upward to a level where the tip of the needle 18 is inserted into the needle port 22 at the inlet end of the selected trap column 21 to connect the supply passage 15 to the inlet end of the same column 21.

A dilution passage 19, which is a characteristic element of the present invention, is connected to the second selector valve 17 provided in the supply passage 15. The second selector valve 17 is used for selectively directing the liquid drawn by the liquid-sending pump 16 to either the trap column 21 or the dilution passage 19. It has three ports e, f and g. A tube extending from the pump 16 (i.e. the upstream portion of the supply passage 15) is connected to port e; a tube leading to the first needle 18 (i.e. the downstream portion of the supply passage 15) is connected to port f; and one end of the dilution passage 19 is connected to port g. The other end of the dilution passage 19 is connected to the collection passage 32 via a T-joint 33 provided immediately downstream from the second needle 31, whereby a liquid flowing through the dilution passage 19 (i.e. the diluting liquid) can be introduced into the collection passage 32.

A controller 52, including a central processing unit (CPU) and other elements, automatically conducts the preparative separation-purification process by performing the setting of the switching operations of the first and second selector valves 14 and 17, the operation of the liquid-sending pump 16 (e.g. the flow rate or flow velocity) as well as the driving operation of the triaxial drive mechanism 51, according to a predetermined program. An operation unit 53 allows users to enter or set conditions for the preparative separation-purification process and other information.

Figure 2:
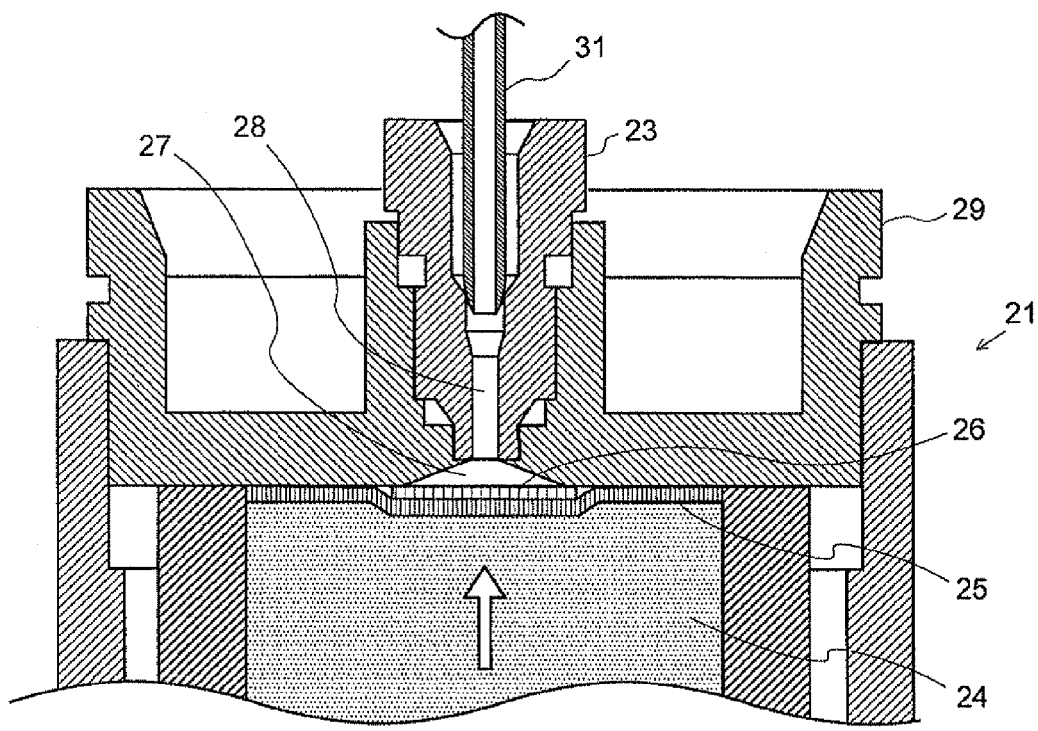
FIG. 2 is a sectional view of a portion around the outlet end of a trap column used in the preparative separation-purification system of the embodiment.

The configuration of the trap column 21 in the present embodiment is hereinafter described in detail. FIG. 2 is an enlarged sectional view showing the configuration of the outlet portion of the trap column 21 used in the present embodiment. The trap column 21 has an inner space for containing a filler for capturing a target component (this space is hereinafter called the filler-containing area 24). At the end of the filler-containing area 24, a lid 29 having an aperture 27 for allowing the passage of liquid is attached, with a cavity formed on the outside of the aperture 27. The needle port 23 is fitted in this cavity, whereby the aperture 27 is connected to the passage formed in the needle port 23 (this passage is hereinafter called the inner port passage 28).

Figure 5:
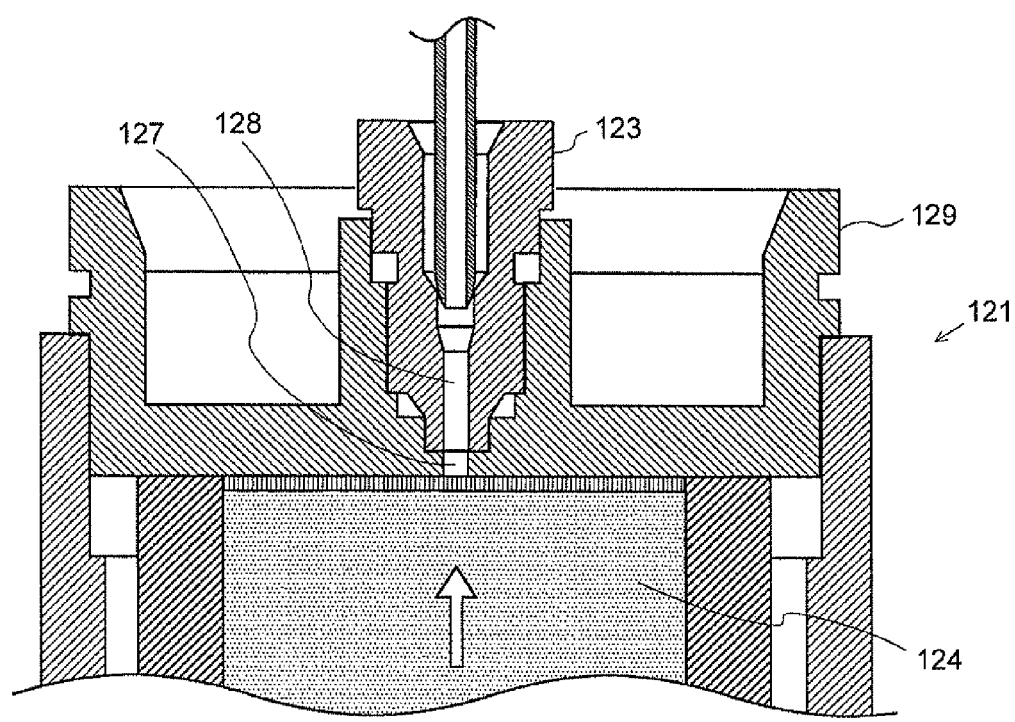
FIG. 5 is a sectional view of a portion around the outlet end of a trap column used in a conventional preparative separation-purification system.

The trap column 21 in the present embodiment is characterized in that the aperture 27 has a tapered shape whose sectional area gradually decreases in the flowing direction of the liquid (which is indicated by the arrow in FIG. 2). The inner diameter of the aperture 27 is 6 mm on the upstream side and 0.8 mm on the downstream side. The filler-containing area 24 located on immediately upstream side of the aperture 27 has an inner diameter of 20 mm, while the inner port passage 28 located on immediately downstream side of the aperture 27 has an inner diameter of 0.8 mm. Thus, the trap column 21 in the present embodiment is designed so that the diameter of the area which the liquid introduced into the column 21 passes through after exiting the filler-containing area 24 gradually decreases. As compared to the conventional trap column 121 shown in FIG. 5, in which the area that the liquid can pass through is suddenly reduced to substantially the same diameter as that of the inner port passage 128 of the needle port 123 at the point where the liquid flowing through the column 121 exits from the filler-containing area 124 and enters the aperture 127, the present trap column 21 is less likely to allow the liquid to stand still in the aforementioned area, and the deposition of the target component at the outlet end of the trap column 21 is less likely to occur.

Another characteristic element of the trap column 21 in the present embodiment is the filter provided between the filler-containing area 24 and the aperture 27 for preventing deposition of target components (this filter is hereinafter called the deposition-preventing filter 26). The deposition-preventing filter 26 is located on the outside (the downstream side) of a mesh cap 25 attached to the outlet end of the filler-containing area 24. This cap 25 is a conventionally used element provided at both ends of the filler-containing area 24 to prevent an outflow of the filler as well as disperse the liquid. The deposition-preventing filter 26 is a Nylon Net Filter with a pore size of 20 µm (a product of EMD Millipore Corporation, product code: NY2004700). The cap 25 is a stainless mesh filter with a pore size of 2 µm.

Even if a target component eluted from the filler by the eluting solvent leaves a deposit and crystallizes immediately after exiting the filler-containing area 24, the deposition-preventing filter 26 on the downstream side of the filler-containing area 24 suppresses the growth of crystals of the target component and thereby prevents the clogging of the passage.

An operation of the automatic preparative separation-precipitation by the preparative separation-precipitation system of the present embodiment is hereinafter described. Initially, to capture a target component on the grains of the filler in the trap column 21, the controller 52 changes the passage configuration so as to connect the solution container 11 (port b) and the supply passage 15 (port a) by the first selector valve 14 as well as the supply passage 15 (port e) and the first needle 18 (port f) by the second selector valve 17, and energizes the liquid-sending pump 16 to send the solution at a predetermined constant flow rate. Prior to this operation, the first needle 18 is connected to the needle port 22 at the inlet end of a predetermined trap column 21, the second needle 31 is connected to the needle port 23 at the outlet of the same trap column 21, and the ejection nozzle 34 is inserted into the disposal port 61.

The liquid-sending pump 16 draws the solution from the solution container 11 and sends it into the trap column 21 through its inlet end. Then, the target component in the solution is captured onto the grains of the filler in the trap column 21. The mobile phase from which the target component has been removed exits from the outlet end, to be discharged through the collection passage 32 and the ejection nozzle 34 into the disposal port 61.

After the solution is supplied to the trap column 21 for a predetermined period of time or until the solution prepared in the solution container 11 is used up, the controller 52 switches the first selector valve 14 to connect the wash-liquid container 12 (port c) and the supply passage 15 (port a). Then, the liquid-sending pump 16 draws pure water from the wash-liquid container 12 and sends it into the trap column 21 through its inlet end. As a result, unwanted water-soluble substances, such as salt that has adhered to the grains of the filler during the process of capturing the target component, are removed from the trap column 21, to be discharged through the collection passage 32 and the ejection nozzle 34 into the disposal port 61. By this supply of pure water, the mobile phase remaining inside the trap column 21 immediately before the beginning of the supply of water is replaced by the water, and the trap column 21 becomes filled with water. The target component captured on the grains of the filler is strongly adsorbed and barely eluted into the water. Therefore, at this point, the target component remains in the captured state within the trap column 21.

Subsequently, the controller 52 switches the first selector valve 14 to connect the solvent container 13 (port d) and the supply passage 15 (port a). Then, the liquid-supply pump 16 begins to draw the eluting solvent (dichloromethane) and introduce it into the trap column 21 through its inlet end.

When the eluting solvent is supplied to the trap column 21, the target component captured on the grains of the filler is eluted into the solvent. Accordingly, the controller 52 calculates the period of time t1 required for completely removing the water, based on the void volume in the trap column 21 (i.e. the volume of water remaining in the trap column 21 immediately before the introduction of dichloromethane begins) and the flow rate of dichloromethane supplied by the pump 16. When the period of time t1 has elapsed from the beginning of the supply of the eluting solvent, the ejection nozzle 34 is removed from the disposal port 61 and inserted into a predetermined collection container 42 to begin preparative separation of the target component. In this state, the eluate containing the target component flows through the collection passage 32, to be eventually dropped from the ejection nozzle 34 into the selected collection container 42.

After the eluting solvent begins to be discharged from the outlet end of the trap column 21, an eluate containing the target component at a high concentration almost simultaneously begins to flow in the collection passage 32 since dichloromethane has a strong eluting power. In conventional systems, this situation is likely to lead to deposition of the target component within the passage and the consequent clogging of a tube or valve, which impedes the flow of the eluate. To address this problem, in the system of the present embodiment in such a manner that, the controller 52 operates the second selector valve 17 so that this valve is intermittently switched from the first needle 18 (port f) to the dilution passage 19 (port g) for a predetermined period of time after the eluting solvent begins to be discharged from the outlet end of the trap column 21. While the second selector valve 17 is switched to the dilution passage 19, the dichloromethane sucked by the pump 16 is directly sent into the collection passage 32 without passing through the trap column 21.

By this operation, the eluate containing the target component at a high concentration is diluted by the diluting liquid, so that deposition of the target component in the collection passage 32 is less likely to occur. Thus, in the present embodiment, the dichloromethane contained in the solvent container 13 serves not only as a solvent for eluting the target component from the trap column 21 but also as a liquid for diluting the eluate in the collection passage 32.

While the diluting liquid is intermittently introduced in the previously described manner, the eluate from the trap column 21 (dichloromethane with the target component contained therein) and the diluting liquid introduced from the dilution passage 19 (dichloromethane with no target component contained therein) alternately flow in the collection passage 32. Therefore, even if the target component in the eluate leaves deposits on and sticks to the tube or valve while the eluate is flowing through the collection passage 32, the deposited compound will be dissolved in the subsequently supplied diluting liquid, whereby clogging of the passage is effectively prevented.

For the aforementioned intermittent supply of the diluting liquid, users can previously set a desired interval of supplying the diluting liquid and a desired length of time for one cycle of the supply of the diluting liquid. Increasing the ratio of the supply amount of the diluting liquid to that of the eluting solvent improves the effect of preventing the deposition of the target component. However, it also increases the length of time required for drying the target component since a larger amount of diluting liquid will be mixed in the eluate collected in the collection container 42. Accordingly, it is desirable to reduce the supply amount of the diluting liquid as much as possible within the range where clogging of the passage will not occur.

Furthermore, in the system of the present embodiment, deposition of the target component at the outlet end of the trap column 21 is also prevented by adopting the tapered shape of the aperture 27 at the outlet end of the trap column 21 and providing the deposition-preventing filter 26 on the upstream side of the aperture 27. This also suppresses the clogging of the passage on the upstream side of the T-joint 33.

Since the amount of target component captured by the filler in the trap column 21 is limited, the concentration of the target component contained in the eluate decreases after a certain period of time from the beginning of the introduction of dichloromethane into the trap column 21. Accordingly, when a predetermined period of time has elapsed from the beginning of the preparative separation process, or when a predetermined amount of dichloromethane has been supplied, the controller 52 removes the ejection nozzle 34 from the collection container 42 and places it back into the disposal port 61. Thus, the preparative separation process is completed.

In the case where the preparative separation-purification process using another trap column on the column rack 20 is to be performed, the fraction collector head 37 is moved by the triaxial drive mechanism 51 to connect the second needle 31 to the outlet end of the next trap column, and simultaneously, the tip of the ejection nozzle 34 is inserted into the next collection container. The first needle 18 is also moved by another drive mechanism (not shown) so as to be connected to the inlet end of the aforementioned next trap column. After the solution container 11 is replaced with a new one holding a different solution (which contains a target component to be separated and purified the next time), the previously described preparative separation-purification process is similarly performed. Instead of letting users manually replace solution containers 11, the system may include a mechanism for changing the passage configuration so as to automatically connect another solution container to the supply passage 15. Such a mechanism can be easily created by adding a passage selector valve.

After the fractions of eluate containing different target components have been collected in the respective collection containers 42, the target components can be extracted in solid forms by heating the eluate or centrifuging it under a vacuum.

Figure 3:
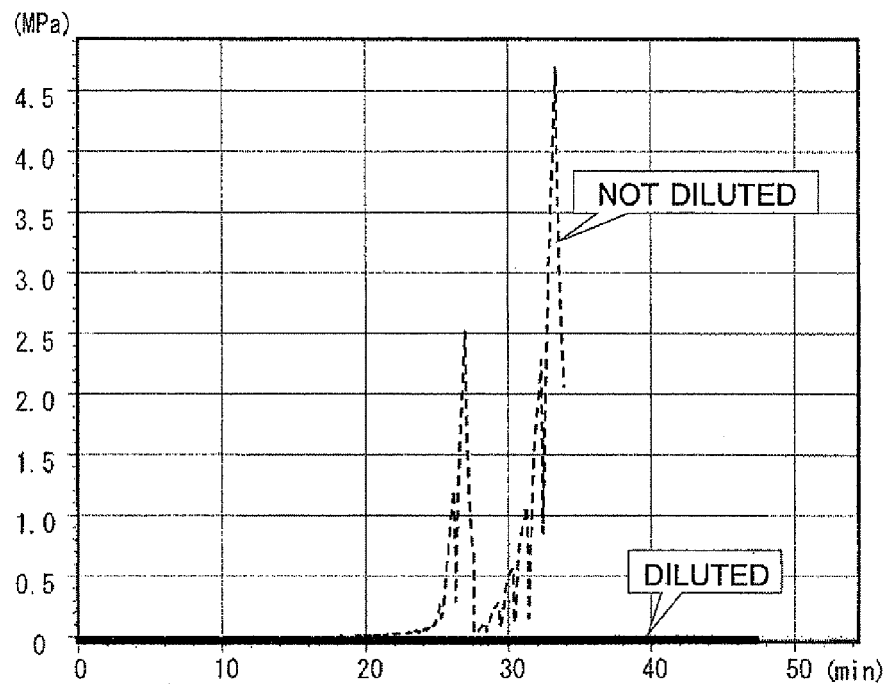
FIG. 3 is a graph showing a change in the pressure at the inlet of the trap column in the preparative separation-purification system of the embodiment.

FIG. 3 shows a change in the pressure of an eluting solvent at the inlet end of the trap column 21 in the preparative separation-purification system of the present embodiment. In the experiment, the eluting solvent (dichloromethane/methanol (9:1, v/v)) was passed at a constant flow rate of 0.1 ml/min through the trap column 21 in which a target component (tolfenamic acid, 100 g) had been captured. The graph shows that, when no diluting liquid (dichloromethane/methanol (9:1, v/v)) was supplied, the pressure began to increase at about 25 minutes from the beginning of the supply of the eluting solvent, whereas no increase in the pressure was observed when the eluting solvent was supplied. This result confirms that introducing a diluting liquid can suppress the clogging of the tubes.

It should be noted that the previous embodiment is a mere example of the present invention. Any change, modification or addition appropriately made within the spirit of the present invention will evidently fall within the scope of claims of the present patent application.

Figure 4:
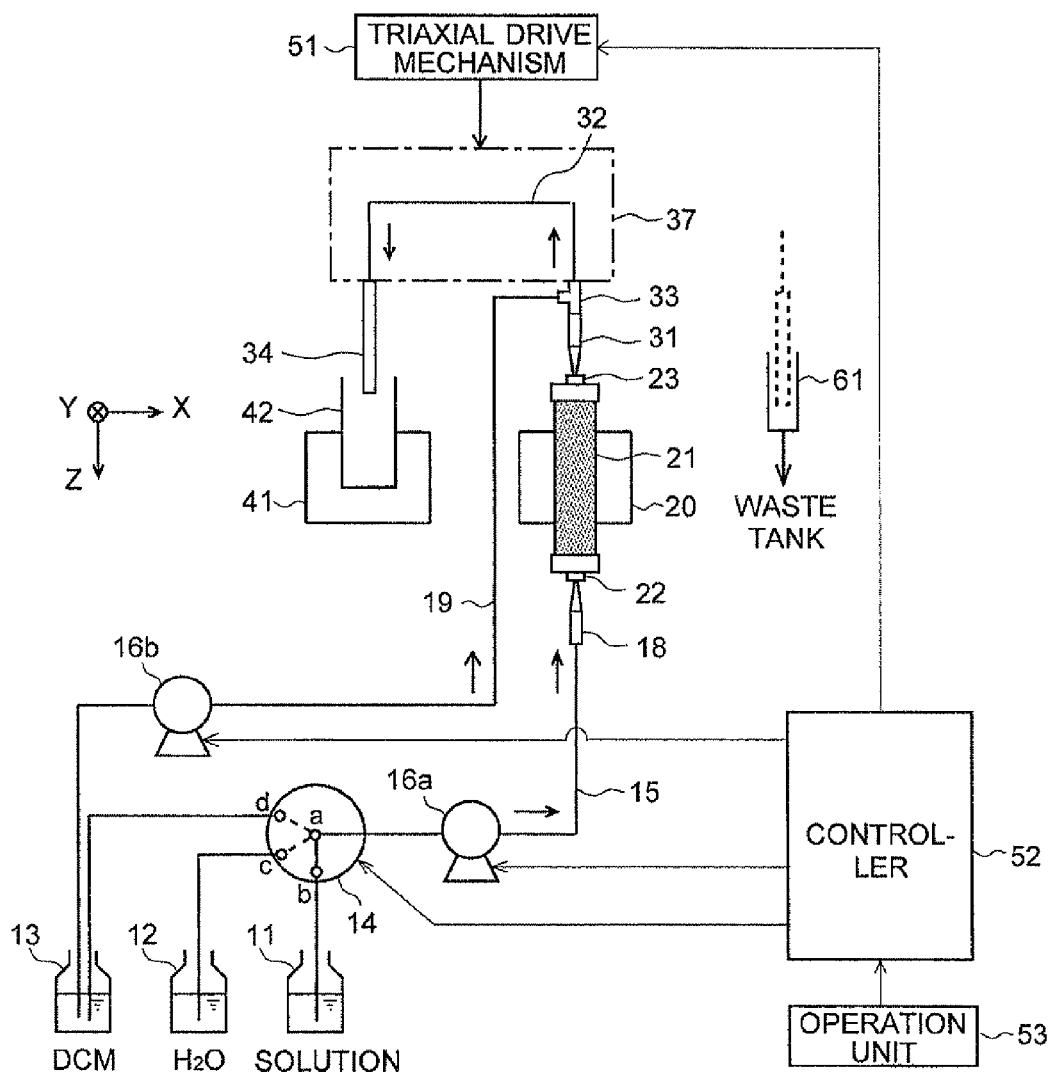
FIG. 4 is a schematic configuration diagram of another embodiment of the preparative separation-purification system according to the present invention.

For example, the preparative separation-purification system of the previous embodiment used only one liquid-sending pump 16 and one selector valve 17 to perform both the supply of the eluting solvent to the trap column 21 and the supply of the diluting liquid to the dilution passage 19. However, this is not the only possible configuration. Another example is shown in FIG. 4, in which a liquid-sending pump 16*b* for sending a diluting liquid to the dilution passage 19 is provided in addition to the liquid-sending pump 16*b* for supplying a liquid to the trap column 21, and the controller 52 alternately energize these pumps 16*a* and 16*b* during the process of preparative separation of the target component. Furthermore, unlike the examples of FIG. 1 or 4 in which the same kind of liquid (dichloromethane) is used as both the eluting solvent and the diluting liquid and supplied from the same container 13, it is possible to hold the eluting solvent and the diluting liquid in separate containers and/or use different kinds of liquids as the eluting solvent and the diluting liquid.

Figure 6:
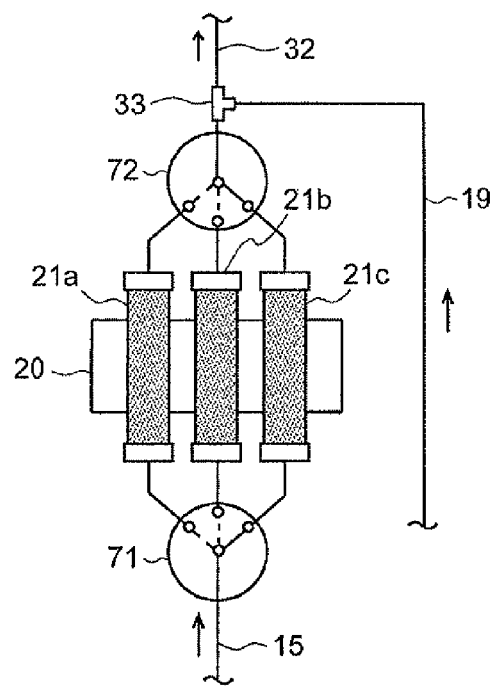
FIG. 6 is a schematic diagram showing another example of the connecting mechanism between an external passage and the trap columns used in the present invention.

Furthermore, although the system according to the previous embodiment used the connecting mechanism having needles and needle ports to connect each trap column 21 to external passages (the supply passage 15 and the collection passage 32), it is possible to use a different type of connecting mechanism. One specific example is shown in FIG. 6, in which a plurality of trap columns 21*a*, 21*b* and 21*c* is arranged parallel to each other, with tubes directly connected to the inlet and outlet ends of these trap columns, each tube having the other end connected to a selector valve 71 or 72 so that one of the trap columns can be selectively connected to the supply passage 15 and the collection passage 32 by switching the valves 71 and 72. Even in the case of adopting this mechanism, it is possible, as in the previous embodiment, to merge the dilution passage 19 with the collection passage 32, to give a tapered shape to the aperture for discharging liquid from the trap column 21*a*, 21*b* or 21*c*, and to provide the deposition-preventing filter at the inlet of this aperture to prevent deposition of a target component on the downstream side of the trap column.

EXPLANATION OF NUMERALS

11 . . . Solution Container
12 . . . Wash-Liquid Container
13 . . . Solvent Container
14 . . . First Selector Valve
15 . . . Supply Passage
16 . . . Liquid-Sending Pump
17 . . . Second Selector Valve
18 . . . First Needle
19 . . . Dilution Passage
21 . . . Trap Column
22, 23 . . . Needle Port
24 . . . Filler-Containing Area
25 . . . Cap
26 . . . Deposition-Preventing Filter
27 . . . Aperture
28 . . . Inner Port Passage
29 . . . Lid
31 . . . Second Needle
32 . . . Collection Passage
34 . . . Ejection Nozzle
37 . . . Fraction Collector Head
42 . . . Collection Container
51 . . . Triaxial Drive Mechanism
52 . . . Controller
61 . . . Disposal Port

The invention claimed is:

1. A preparative separation-purification system comprising:
   a) a supply passage for supplying an eluting solvent to one end of a trap column, the eluting solvent being a solvent having an eluting power on a target component captured in the trap column;
   b) a collection passage for sending an eluate exiting another end of the trap column to a collection container for collecting the target component, the eluate being the eluting solvent containing the target component, the collection passage being a tube whose first end is connected via a joint to a base end of a needle detachable to the another end of the trap column, and whose second end is connected to a base end of an ejection nozzle movable directly above the collection container;
   c) a diluting liquid supply passage, connected to the joint, for supplying into the collection passage a diluting liquid for lowering a concentration of the target component in the eluate; and
   d) a liquid-sending system for alternately performing supply of the eluting solvent into the supply passage and supply of the diluting liquid into the diluting liquid supply passage.

2. The preparative separation-purification system according to claim 1, wherein the liquid-sending system comprises:
   e) a liquid-sending pump provided in the supply passage;
   f) a passage selector, provided in the supply passage between the liquid-sending pump and the trap column, for switching the passage so that the liquid supplied through the liquid-sending pump is selectively sent to either the trap column or the diluting liquid supply passage; and
   g) a controller for operating the passage selector so as to alternately perform supply of liquid to the trap column and supply of liquid to the diluting liquid supply passage.

3. The preparative separation-purification system according to claim 2, wherein: an additional passage selector is provided on the upstream side of the liquid-sending pump in such a manner that either the eluting solvent or the diluting liquid will be selectively drawn by the liquid-sending pump by changing the setting of the additional passage selector.

4. The preparative separation-purification system according to claim 1, wherein the liquid-sending system comprises:
   h) a first liquid-sending pump provided in the supply passage;
   i) a second liquid-sending pump provided in the diluting liquid supply passage; and
   j) a controller for operating the first liquid-sending pump and the second liquid-sending pump so as to alternately perform the supply of the eluting solvent by the first liquid-sending pump and the supply of the diluting liquid by the second liquid-sending pump.

* * * * *